(12) United States Patent
Pendharkar et al.

(10) Patent No.: US 8,924,359 B1
(45) Date of Patent: Dec. 30, 2014

(54) COOPERATIVE TIERING

(75) Inventors: Niranjan Pendharkar, Pune (IN); Ashish Karnik, Pune (IN)

(73) Assignee: Symantec Corporation, Mountain View, CA (US)

( * ) Notice: Subject to any disclaimer, the term of this patent is extended or adjusted under 35 U.S.C. 154(b) by 420 days.

(21) Appl. No.: 13/081,719

(22) Filed: Apr. 7, 2011

(51) Int. Cl.
*G06F 17/30* (2006.01)

(52) U.S. Cl.
CPC .................. *G06F 17/30073* (2013.01)
USPC ........... 707/665; 707/661; 707/662; 707/666; 707/667; 707/672; 707/673; 707/822; 710/8; 711/170; 711/6; 711/3; 711/206; 711/173; 711/114; 711/136

(58) Field of Classification Search
USPC ......... 707/661, 662, 665, 666, 667, 672, 673, 707/822, 999.205; 710/8; 711/170, 6, 3, 711/206, 173, 114, 136
See application file for complete search history.

(56) References Cited

U.S. PATENT DOCUMENTS

| 8,239,584 B1* | 8/2012 | Rabe et al. ................. 710/8 |
| 2011/0202705 A1* | 8/2011 | Hayashi et al. ............ 711/6 |

* cited by examiner

*Primary Examiner* — Syling Yen
(74) *Attorney, Agent, or Firm* — Campbell Stephenson LLP

(57) ABSTRACT

Various systems and methods for cooperative tiering between an application and a storage device. One method can include receiving information from the application where the information identifies a storage object and identifies a location in a storage device. The location identifies one or more tiers of a plurality of tiers included in the storage device, and the storage object is assigned to the one or more tiers. The method also involves detecting whether the storage object is stored in the one or more tiers. If not, the storage device copies the storage object to the identified location. The information can also include an instruction by the application to move the storage object from a first tier to a second tier.

20 Claims, 5 Drawing Sheets

_(54)_ COOPERATIVE TIERING

FIELD OF THE INVENTION

This invention relates to organization of data and, more particularly, to specifying which tier of a storage array data should be stored in.

DESCRIPTION OF THE RELATED ART

Storage arrays provide multiple types of storage. The various types of storage are known as tiers. Each tier has a set of characteristics, such as access time, cost, type of storage device, and the like. Generally, higher tiers in a storage array have more desirable operating characteristics, such as low latency, or high reliability. Storage devices included in higher tiers are often more expensive storage devices than those used in lower tiers. For example, a higher tier of an array may use a solid state drive, which is relatively expensive, to store data while a lower tier may use a tape drive, which is relatively inexpensive, to store data. Given that storage in higher tiers is generally more expensive than storage in lower tiers, it is common to store more important data in higher tiers and less important data in lower tiers.

A storage array can measure the importance of data and move more important data to higher tiers and less important data to lower tiers. This is known as data tiering. For example, a storage array can detect how frequently data is accessed and move more frequently accessed data to higher tiers and less frequently accessed data to lower tiers. Frequency of access is one measure of how important data is. Data that is accessed frequently is considered more important than data that is less frequently accessed. Storage arrays typically organize data into physical portions, or chunks. The storage array is responsible for organizing chunks into appropriate tiers. For example, if a particular chunk contains important data, the storage array can move the chunk to a higher tier in the storage array. If a chunk contains less important data, the storage array can move the chunk to a lower tier in the storage array.

Storage arrays provide one level of abstraction related to data storage. Usually, storage arrays are considered a physical layer, with data organized according to physical associations, e.g., chunks. Another level of abstraction is a logical layer provided by file systems. File systems organize data according to logical associations, e.g., files. All the data in a given file is said to be logically associated since all the data belongs to the same file. Storage arrays and file systems can refer to the same set of data, but the way file systems organize and address the data differs from the way storage arrays organize and address the data. Storage arrays are generally unaware of files and do not differentiate between files and file types when performing tiering operations. Consequently, tiering operations can make inefficient use of limited storage resources and can cause failure to comply with data security and other organizational policies.

SUMMARY OF THE INVENTION

Various systems and methods for cooperative tiering between an application and a storage device are disclosed. For example, one method can include receiving information from the application where the information identifies a storage object and identifies a location in a storage device. The location identifies one or more tiers of a plurality of tiers included in the storage device, and the storage object is assigned to the one or more tiers. The method also involves detecting whether the storage object is stored in the one or more tiers. If not, the storage device copies the storage object to the identified location. The information can also include an instruction by the application to move the storage object from a first tier to a second tier.

In an embodiment, the method involves detecting a move operation that specifies that the storage object is to be moved from a first tier to a second tier and inhibiting the move operation in response to detecting that the second tier is not included in the identified location. The method can also involve detecting an attribute value of the storage object and adding information identifying the storage object to the information received from the application in response to detecting the attribute value. In an embodiment, the attribute value indicates one of a file type of the storage object or a confidentiality of the storage object. In another embodiment, the method involves detecting that the storage object is stored in a location that is not included in the location specified by the information received from the application.

The method can also involve performing a scan of multiple storage objects where the scan detects an attribute value for each storage object and assigning each storage object to a location based on the attribute value.

An example of a system can include one or more processors and memory coupled to the one or more processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
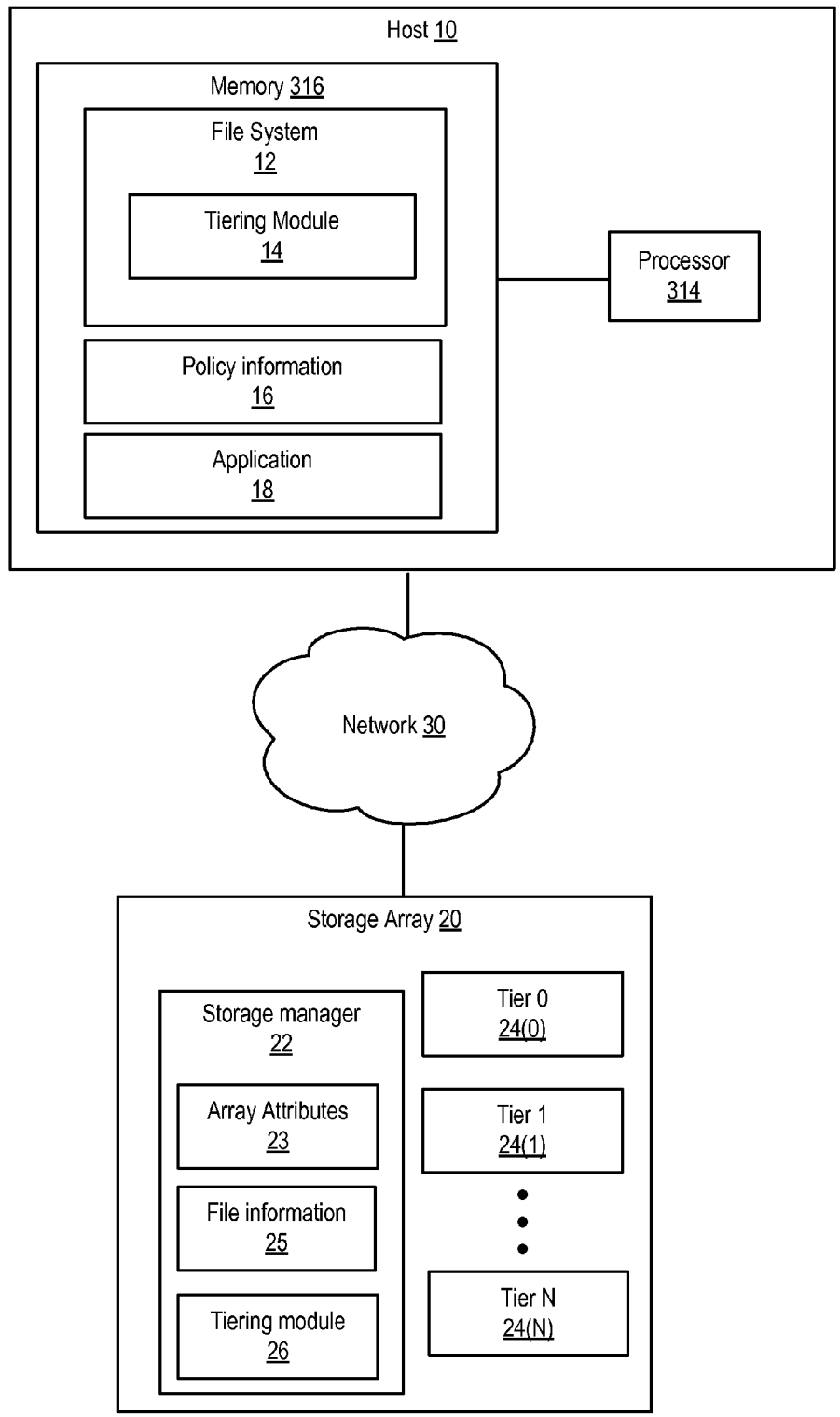
FIG. 1 is a block diagram of a system that performs cooperative tiering, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

A storage array is configured to receive information regarding tiering operations from a file system. The storage array can use this information to implement policies based on characteristics of files. The file-based policies are specified at a file system level and information regarding how to implement the policies is passed to the storage array. The storage array can use this information to improve efficiency and security of tiering operations. For example, the storage array can maintain chunks of sensitive files in more secure tiers, rather than move the chunks to less secure tiers, even if the storage array's policy would be to move the chunks to less secure tiers based, e.g., on age or infrequent access to the chunks.

FIG. 1 is a block diagram of a computing system. As shown, the computing system includes a host 10 and a storage array 20, coupled by a network 30. Network 30 can include a WAN (Wide Area Network), such as the Internet, one or more LANs (Local Area Networks), and/or one or more SANs (Storage Area Networks). In an embodiment, host 10 can include and/or be coupled (e.g., via a bus, network, or other appropriate interconnect) to storage array 20. Host 10 is a computing device such as a personal computer, laptop computer, server, personal digital assistant, cell phone, or the like. Host 10 includes at least one processor 314 and a memory 316.

Memory 316 stores program instructions executable by processor 314 to implement a file system 12, which includes a tiering module 14. Memory 316 also stores policy information 16 and an application 18. Tiering module 14 can interact with storage manager 22, in particular tiering module 26, to enhance tiering operations performed by storage array 20.

Application 18 can be a word processing program, email program, graphic editing program, database application, or the like. Application 18 accesses (e.g., by generating and/or consuming) data on storage array 20. Application 18 operates on files. Application 18 issues commands to file system 12 to read or write to the files. Application 18 can pass a file name and data modifications to file system 12 along with the command to read or write the file. For a given file passed to file system 12 by application 18, file system 12 identifies blocks that contain data for the file and either returns requested data from the blocks to application 18 (in the case of a read) or stores data specified by application 18 to the blocks (in the case of a write).

File system 12 maintains a logical view of storage array 20. File system 12 can view storage array 20 as one or more logical unit numbers (LUNs). A LUN can include storage locations in multiple tiers. File system 12 maintains mapping information that shows each LUN divided into blocks. A block is the smallest portion of data file system 12 operates on. The mapping info indicates which files have data stored in which blocks. File system 12 also maintains logical to physical mapping information that indicates which physical addresses in storage array 20 each block is mapped to. File system 12 uses the logical to physical mapping information to identify which locations in the storage array are used to contain a file's data. While file system 12 is discussed throughout this disclosure as a file system, in an embodiment, file system 12 can be implemented as another type of application that maintains a logical view of data stored in storage array 20, e.g., a database.

Storage array 20 provides persistent data storage, such that data stored in storage array 20 will remain stored even after storage array 20 is powered off. Storage array 20 can include one or more storage devices or storage appliances such as, for example, a solid state drive, a hard disk, a compact disc (CD), a digital versatile disc (DVD), sequential access media (e.g., tape storage), or other mass storage device, file serving appliance, or storage system (e.g., a redundant array of independent disks (RAID) system or an optical storage jukebox). Storage array 20 can also include one or more types of storage media, including solid state media (e.g., flash drives), optical media (e.g., CDs and DVDs), and magnetic media (e.g., hard disks or magnetic tape). In an embodiment, storage array 20 can be implemented using cloud storage, in which storage array 20 is a logical storage device to which physical storage device(s) are allocated on an as-needed and/or as-contracted basis.

The data stored in storage array 20 is divided into multiple tiers 24(0) through 24(N), where N is an integer greater than or equal to two and indicates the number of tiers in storage array 20. Each tier can be composed of one or more homogenous storage devices of a different type than those in the other tiers, e.g., tier 24(0) can include exclusively solid state drives and tier 24(1) can include exclusively hard disks. Tiers can also be organized based on one or more performance characteristics. For example, tier 24(0) can include storage devices that are relatively high speed, and tier 24(1) can include storage devices that are relatively low speed. For example, tier 24(0) can include high speed hard drives, e.g., newer technology, and tier 24(1) can include lower speed hard drives, e.g., older technology. In an embodiment, each tier can include multiple types of storage devices.

Storage array 20 is divided into groupings of data known as chunks. A chunk is a portion of data stored at a range of typically contiguous addresses in a single tier. A chunk is the smallest unit of data that storage manager 22 operates on. For example, storage manager 22 can view a 1 gigabyte (Gb) hard disk in storage array 20 as 1000 chunks having size 1 megabyte (Mb). The chunks can be sequentially numbered from 1 to 1000 and can correspond to physical addresses on the hard disk. For example, chunk 1 can include the first 1 Mb of data stored in the hard disk, e.g., at the first 1 million single byte addresses, chunk 2 can include the second 1 Mb of data stored in the hard disk, and so on. In an embodiment, the size of chunks is a configurable attribute of storage array 20 and is included in array attributes 23. An administrator can specify chunk size for the storage array such that storage manager 22 can manipulate data at a coarser or finer level of granularity.

Storage manager 22 provides storage management functions. Tiering module 26 performs tiering operations. A tiering operation refers to organizing chunks into tiers based upon one or more policies included in array attributes 23. Array attributes 23 can be specified by an array vendor or can be configured by a user such as an administrator. Array attributes 23 include a specification of the chunk size used by the array. Array attributes 23 also include policies that specify the criteria for moving data between tiers or performing tiering operations. For example, array attributes 23 can specify that access frequency (also known as temperature) of a chunk is the criterion which is determinative of which tier the chunk belongs in. That is, a policy can specify that which tier a chunk is stored in depends upon how frequently file system 12 accesses data in the chunk. Array attributes 23 can include information that specifies a range of attribute values for one or more tiering criteria. For example, if temperature is a criteria upon which tiering decisions are based, array attributes 23 can include information that specifies a range of temperatures for the chunks in each tier, such as if data is accessed more frequently than once a week, store the data in tier 1. If the data is accessed less frequently than once a week, but more frequently than once a month, store the data in tier 2, and so on.

Tiering module 26 can monitor the I/O temperature of chunks and move them to the appropriate tier when an I/O temperature threshold is crossed, such as access frequency increasing to more than once a week. For example, when file system 12 accesses data in a chunk, either reading or writing to the chunk, tiering module 26 records an indication that the chunk was accessed. Tiering module 26 calculates temperature by tracking the number of accesses to a chunk over a specified time period. Tiering module 26 can also distinguish between the type of access, e.g., read or write. Tiering policies can specify different behavior for different types of access and tiering module 26 can perform different tiering operations based on the types of access.

Array attributes 23 can include various other tiering criteria, such as priority of a chunk. For example, storage manager 22 can monitor an attribute, such as a register value, for each chunk that indicates the chunk's priority and move the chunk in response to detecting a change in the value. The value can be specified by a user, for example, a user of application 18. Another example of a tiering criterion is age of a file. This can refer to the time since the file was created by an application or the time since the file was previously accessed. Array attributes 23 can specify a policy that chunks less than a week old should be stored in tier 1, more than a week old but less than a month old in tier 2, and so on. Another example of a tiering criterion is the confidentiality of a chunk. For example, a policy can specify that confidential data should never be stored in a given tier, e.g., a tier that utilizes storage in a public cloud. The above are merely examples. Tiering policies can be specified based on a wide range of factors related to goals and objectives of an enterprise as well as compliance with standards set by regulatory bodies. Tiering policies can be monitored and changed, e.g., based on effective utilization of storage or based on changed enterprise objectives. For example, an administrator can specify that a temperature or age threshold should be modified.

Tiering module 26 monitors the chunks in storage array 20 and implements tiering policies based on array attributes 23. When tiering module 26 detects that a threshold associated with a criterion has been met for a given chunk, tiering module 26 initiates a tiering operation for the chunk. This can involve copying the data stored in the chunk to another tier. In an embodiment, tiering module 26 performs tiering operations on a periodic basis. In such embodiments, tiering module 26 tracks chunks that are to be moved to a different tier. This can involve keeping a list of chunks that are to be moved and the source and destination tiers for the chunks, or any other suitable mechanism for tracking and describing pending tiering operations. For example, tiering module 26 can detect chunks that are to be moved and add the chunks to a list. Alternatively, once each period, tiering module 26 can scan one or more chunks to detect whether the chunks need to be moved, e.g., an attribute associated with the chunks indicates that the chunks should be in a different tier, and add those chunks to a list. Then, on a periodic basis, tiering module 26 can move all the chunks on the list from source tiers to destination tiers. Tiering module 26 can also perform tiering operations on a non-periodic basis, e.g., in response to detection of a threshold condition such as disk utilization reaching a specified percentage of capacity.

Tiering module 26 also communicates with file system 12. Tiering module 26 receives information from file system 12 related to policies that that affect tiering operations performed by tiering module 26, particularly policies that are specified at the file system level, e.g., policies that are based on file or file type. Tiering module 26 stores this information in file information 25. Tiering module 26 modifies tiering operations based on file information 25. For example, tiering module 26 can detect that a chunk should be moved to a different tier based, e.g., on the I/O temperature of the chunk. However, if file information 25 indicates that the chunk should not be moved, tiering module 26 can cancel the I/O temperature-based tiering operation. As an example, file information 25 can specify that a chunk may be tiered normally, except that the chunk cannot be moved to one or more specific tiers. File information 25 can include information identifying one or more chunks and for each identified chunk, one or more policies. Such policies can include information identifying specific locations, e.g., tiers, or attribute values. For example, tiering module 26 can initiate a tiering operation in response to detecting that a chunk's I/O temperature exceeds a threshold specified in array attributes 23. The policy information received from file system 12 and stored in file information 25 can specify an alternative temperature threshold value. In such a case, the attribute value specified in file information 25 overrides that stored in array attributes 23 and tiering module 26 modifies the tiering operation accordingly, e.g., cancelling the tiering operation, or performing the tiering operation earlier than would be the case were it not for the attribute value stored in file information 25.

File information 25 can be organized as a list. In such a case, each entry in the list includes information identifying one or more chunks and policy information for each chunk. The chunks can be listed individually, as a group, or a combination of the two. File system 12 can send the information to storage array 20 in band or out of band. In band refers to file system 12 sending the policy information along with a command to access a given chunk. Out of band refers to sending the policy information as a separate transaction.

In an embodiment, file information 25 includes one or more policies based upon organizational objectives. These objectives can relate, for example, to keeping certain information or types of information secure, or to determinations regarding the importance of certain types of information or files. Information to implement the policies can be stored in policy information 16, e.g., by an administrative user and then transferred to file information 25. A user can specify that certain files, or certain file types, should be stored in certain types of storage. For example, file information 25 can indicate that certain files or file types should not be stored in cloud storage, e.g., due to security concerns. For example, a policy can specify that all email files should not be stored in cloud storage due to the risk of the email files being exposed to unintended viewers. Another example policy can specify that certain files or file types should be kept in higher tiers so that there is faster access to the files or file types. In another example, certain files or file types, e.g., mp3 files, are deemed generally unimportant and are thus relegated to lower tiers. The above are merely a few examples of policies and tiering restrictions that embody the policies that can be included in file information 25. Many other examples are possible.

As can be seen, file information 25 can contain directions for performing tiering operations that conflict with tiering operations performed by tiering module 26. In response to tiering module 26 detecting such a conflict, tiering module 26 gives precedence to the policies embodied in file information 25. File information 25 overrides policies implemented by tiering module 26, such as policies embodied in array attributes 23. If a given file is subject to a tiering policy, file system 12 can provide details regarding the tiering policy to tiering module 26 along with information identifying the chunks that store the file's data.

File system 12 can perform a scan of file data stored in the LUN. Based on the scan, and policy information 16, file system 12, in particular tiering module 14, can detect which data is affected by policy information 16. For example, if policy information 16 specifies that files of type mp3 should be stored in a lower tier, all mp3 type files are affected by policy information 16. Tiering module 14 can communicate to tiering module 26 information identifying chunks that store such affected data. In an embodiment, tiering module 14 compiles a list of blocks affected by policy information 16. The blocks are blocks that are subject to additional criteria, as specified in policy information 16, when tiering module 26 performs tiering operations that affect the blocks. File system 12 can translate the block identifiers into information identifying chunks in storage array 20 that store the blocks. Tiering module 26 can add the information received from tiering module 14 to file information 25.

In response to receiving, e.g., from application 18, a request to write a file, file system 12 detects whether the file is subject to policy information 16. If so, when file system 12 passes the information identifying chunks that store the file's data and the write command to storage array 20, file system 12 can also pass information identifying any special constraints the chunks are subject to as a result of policy information 16.

Without cooperation between file system 12 and storage manager 22, when storage manager 22 moves a chunk, the storage manager does so without an awareness of any file associations of the data in the chunk. The chunk may include data from multiple files of multiple types. However, storage manager 22 treats all data in the chunk the same. That is, when storage manager 22 moves the chunk, all data in the chunk is moved. This is undesirable in instances where different files, or different file types, should be treated differently. It may be desirable to treat different files or file types differently. For example, an enterprise may establish policies regarding how certain files or file types are stored. A user, e.g., an administrator, can implement these policies. Typically, policies regarding files and file types are implemented at the level of a file system, since file system manipulates data at a file level.

Transmitting file information to storage manager 22 makes storage manager 22 aware of file based policies and may increase the ability of storage array 22 to comply with policies regarding files and file types. For example, a policy specified at the file system level can specify that mp3 files are to be stored in a lower tier of a storage array. For this example, assume storage manager 22 performs tiering operations based upon how frequently a chunk is accessed. If a chunk storing data for a particular mp3 file is accessed frequently, storage manager 22 may determine that the chunk should be moved to a higher tier. Moving the chunk (and so the mp3 file) to a higher tier defeats the policy of storing mp3 files in a lower tier. However, without information from file system 12, the storage manager 22 has no way of knowing that data stored in a given chunk belongs to a file that has a file type of mp3. The cooperation between file system 12 and storage manager 22 can improve storage resource utilization. For example, the cooperation can help minimize the use of relatively high cost storage devices in upper tiers of storage array 20 for data that should be stored in lower tiers, e.g., data deemed to be unimportant by an organizational policy. Minimizing the use of higher tiers for such data also can improve system performance, by increasing the amount of high performance storage available for data which is frequently used or highly storage performance dependent.

Figure 2:
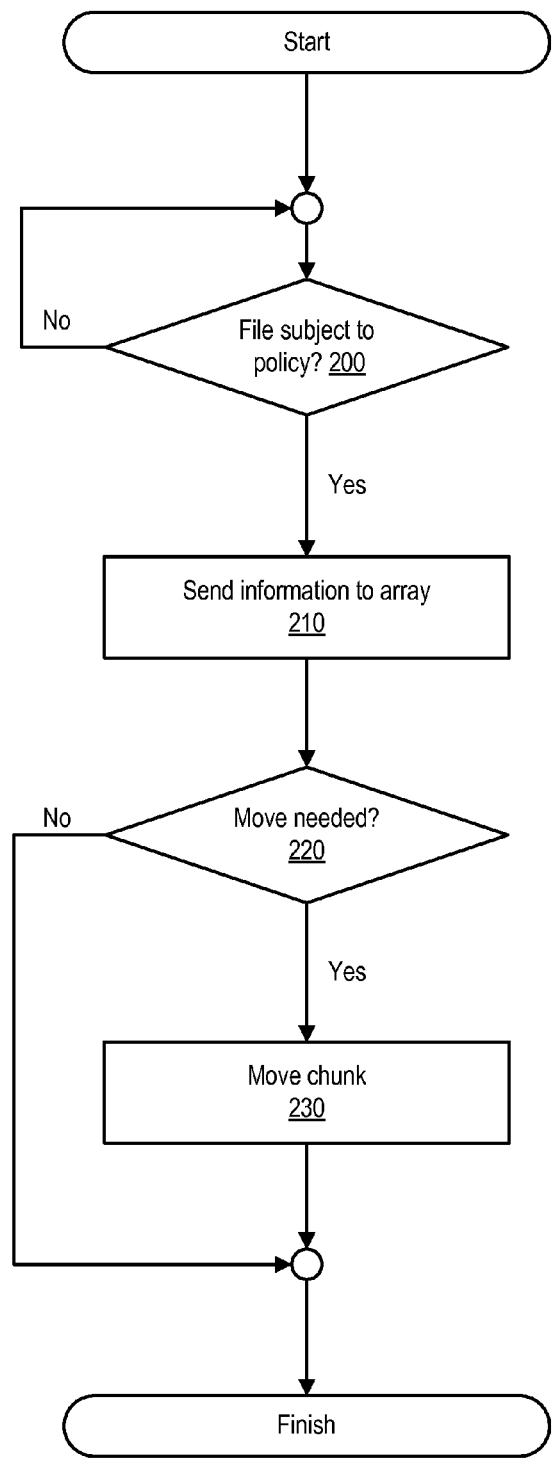
FIG. 2 is a flowchart of a method of performing cooperative tiering, according to one embodiment of the present invention.

FIG. 2 is a flowchart of a method of performing cooperative tiering. This method can be performed by a computing device that implements a tiering module, such as tiering module 14 of FIG. 1. This method can be performed in response to a file system, such as file system 12 of FIG. 1, receiving a I/O command, such as a read or write operation. In an embodiment, the method is performed as a result of the occurrence of a threshold condition. For example, the file system can scan file data and transmit information to a storage array, such as storage array 20 of FIG. 1, periodically in response to detecting that a specified amount of time has passed since the file system has last done so. The file system can scan a portion of a LUN, an entire LUN, or multiple LUNs, e.g., a group of LUNs.

The method begins at 200, where the file system detects whether a file is subject to any specified policies, such as a policy included in policy information 16 of FIG. 1. A tiering module of the file system, e.g., tiering module 14 of FIG. 1, can perform a scan of some or all files managed by the file system. The tiering module can detect whether the file is affected by any policy information in response to detecting an access to the file, e.g., a read or write to the file by an application, such as application 18 of FIG. 1.

If the file system detects that there is policy information for a file that affects how the file's data should be handled by a storage manager, such as storage manager 22 of FIG. 1, especially with regard to tiering operations, the file system sends information identifying the file's data, e.g., the address of one or more chunks, and the policy to the storage manager at 210. The file system can send the information immediately upon detecting that a file is subject to a policy in the policy information. Alternatively, the file system can wait to send the file information for a specified time or until the file system detects the occurrence of a threshold condition. For example, the file system's tiering module can collect information for each file scanned, e.g., in a list, and send the information when the scan is complete or after all files have been scanned.

At 220, the storage manager's tiering module detects whether the file information indicates that a storage object, e.g., chunk, be moved. The file information can specify that specific chunks be stored in a particular tier. If the storage manager's tiering module detects that the chunks are not stored in the specified tiers, the storage manager's tiering module can move the chunks, at 230. If the storage manager's tiering module detects that receiving the file information has not caused any moves to be indicated, the method ends.

Figure 3:
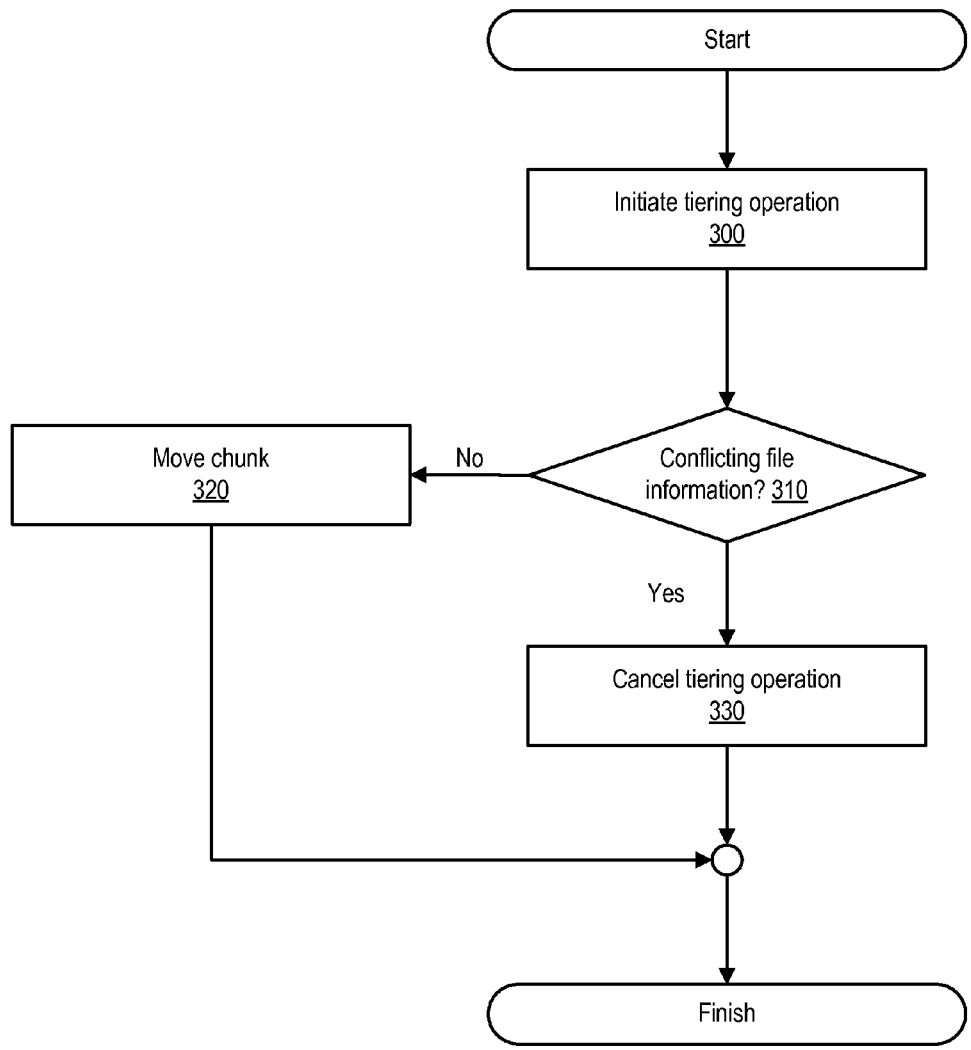
FIG. 3 is a flowchart depicting additional details of a method of performing cooperative tiering, according to one embodiment of the present invention.

FIG. 3 is a flowchart of method of cooperative tiering. At 300 a tiering module, such as tiering module 26 of storage manager 22 of FIG. 1, initiates a tiering operation. The tiering module can initiate the tiering operation based on detecting the occurrence of a threshold condition, e.g., an amount of time elapsed since a previous tiering operation. The tiering module can also initiate a tiering operation in response to detecting a change in value of an attribute of a chunk or in response to receiving information or a command from a file system, such as file system 12 of FIG. 1. The tiering operation specifies one or more chunks to be moved, the source tier where the chunks are stored, and the destination tier that the chunks are to be moved to.

At 310, the tiering module detects whether there is any conflicting file information, e.g., in file information 25 of FIG. 1. For example, the tiering module can detect, based upon a chunk's I/O temperature, that the chunk should be moved to a higher tier. However, the file information can specify that the chunk should be kept in a lower tier. In this case there is a conflict between the tiering operation initiated by the tiering module and the file information. In such a situation, the tiering module cancels the tiering operation at 330. The file information overrides the tiering module's default tiering policies. If there is no conflict, the tiering operation proceeds and the chunk is moved at 320.

Figure 4:
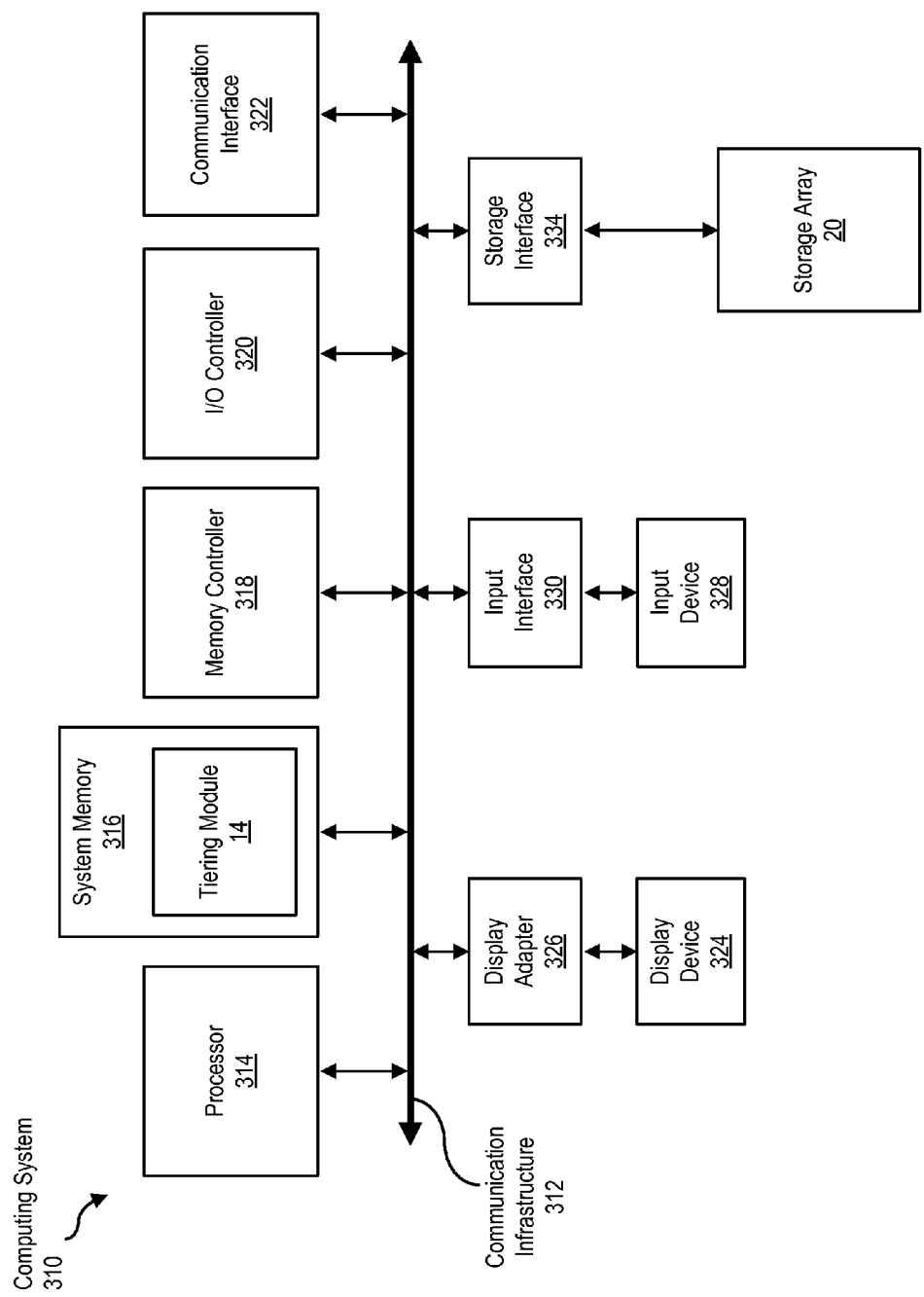
FIG. 4 is a block diagram of a computing device, illustrating how a tiering module can be implemented in software, according to one embodiment of the present invention.

FIG. 4 is a block diagram of a computing system 310 capable of performing cooperative tiering operations as described above. Computing system 310 broadly represents any single or multi-processor computing device or system capable of executing computer-readable instructions. Examples of computing system 310 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 310 may include at least one processor 314 and a system memory 316. By executing the software that implements a tiering module 14, computing system 310 becomes a special purpose computing device that is configured to perform cooperative tiering operations to facilitate array-based storage tiering.

Processor 314 generally represents any type or form of processing unit capable of processing data or interpreting and executing instructions. In certain embodiments, processor 314 may receive instructions from a software application or module. These instructions may cause processor 314 to perform the functions of one or more of the embodiments described and/or illustrated herein. For example, processor 314 may perform and/or be a means for performing the operations described herein. Processor 314 may also perform and/or be a means for performing any other operations, methods, or processes described and/or illustrated herein.

System memory 316 generally represents any type or form of volatile or non-volatile storage device or medium capable of storing data and/or other computer-readable instructions. Examples of system memory 316 include, without limitation, random access memory (RAM), read only memory (ROM), flash memory, or any other suitable memory device. Although not required, in certain embodiments computing system 310 may include both a volatile memory unit (such as, for example, system memory 316) and a non-volatile storage device (such as, for example, storage array 20, as described in detail below). In one example, program instructions executable to implement a tiering module 14 (e.g., as shown in FIG. 1) may be loaded into system memory 316.

In certain embodiments, computing system 310 may also include one or more components or elements in addition to processor 314 and system memory 316. For example, as illustrated in FIG. 4, computing system 310 may include a memory controller 318, an Input/Output (I/O) controller 320, and a communication interface 322, each of which may be interconnected via a communication infrastructure 312. Communication infrastructure 312 generally represents any type or form of infrastructure capable of facilitating communication between one or more components of a computing device. Examples of communication infrastructure 312 include, without limitation, a communication bus (such as an Industry Standard Architecture (ISA), Peripheral Component Interconnect (PCI), PCI express (PCIe), or similar bus) and a network.

Memory controller 318 generally represents any type or form of device capable of handling memory or data or controlling communication between one or more components of computing system 310. For example, in certain embodiments memory controller 318 may control communication between processor 314, system memory 316, and I/O controller 320 via communication infrastructure 312. In certain embodiments, memory controller 318 may perform and/or be a means for performing, either alone or in combination with other elements, one or more of the operations or features described and/or illustrated herein.

I/O controller 320 generally represents any type or form of module capable of coordinating and/or controlling the input and output functions of a computing device. For example, in certain embodiments I/O controller 320 may control or facilitate transfer of data between one or more elements of computing system 310, such as processor 314, system memory 316, communication interface 322, display adapter 326, input interface 330, and storage interface 334.

Communication interface 322 broadly represents any type or form of communication device or adapter capable of facilitating communication between computing system 310 and one or more additional devices. For example, in certain embodiments communication interface 322 may facilitate communication between computing system 310 and a private or public network including additional computing systems. Examples of communication interface 322 include, without limitation, a wired network interface (such as a network interface card), a wireless network interface (such as a wireless network interface card), a modem, and any other suitable interface. In at least one embodiment, communication interface 322 may provide a direct connection to a remote server via a direct link to a network, such as the Internet. Communication interface 322 may also indirectly provide such a connection through, for example, a local area network (such as an Ethernet network), a personal area network, a telephone or cable network, a cellular telephone connection, a satellite data connection, or any other suitable connection.

In certain embodiments, communication interface 322 may also represent a host adapter configured to facilitate communication between computing system 310 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 322 may also allow computing system 310 to engage in distributed or remote computing. For example, communication interface 322 may receive instructions from a remote device or send instructions to a remote device for execution.

As illustrated in FIG. 4, computing system 310 may also include at least one display device 324 coupled to communication infrastructure 312 via a display adapter 326. Display device 324 generally represents any type or form of device capable of visually displaying information forwarded by display adapter 326. Similarly, display adapter 326 generally represents any type or form of device configured to forward graphics, text, and other data from communication infrastructure 312 (or from a frame buffer, as known in the art) for display on display device 324.

As illustrated in FIG. 4, computing system 310 may also include at least one input device 328 coupled to communication infrastructure 312 via an input interface 330. Input device 328 generally represents any type or form of input device capable of providing input, either computer or human generated, to computing system 310. Examples of input device 328 include, without limitation, a keyboard, a pointing device, a speech recognition device, or any other input device.

As illustrated in FIG. 4, computing system 310 may also include a storage array 20 coupled to communication infrastructure 312 via a storage interface 334. Storage array 20 generally represents any type or form of storage device or medium capable of storing data and/or other computer-readable instructions. For example, storage array 20 may include one or more of a magnetic disk drive (e.g., a so-called hard drive), a floppy disk drive, a magnetic tape drive, an optical disk drive, a flash drive, or the like. Storage interface 334 generally represents any type or form of interface or device for transferring data between storage array 20 and other components of computing system 310. A storage device like storage array 20 can perform tiering operations to implement storage policies established by, for example, an enterprise.

In certain embodiments, storage array 20 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage array 20 may also include other similar structures or devices for allowing computer software, data, or other computer-readable instructions to be loaded into computing system 310. For example, storage array 20 may be configured to read and write software, data, or other computer-readable information. Storage array 20 may also be a part of computing system 310 or may be a separate device accessed through other interface systems.

Many other devices or subsystems may be connected to computing system 310. Conversely, all of the components and devices illustrated in FIG. 4 need not be present to practice the embodiments described and/or illustrated herein. The devices and subsystems referenced above may also be interconnected in different ways from that shown in FIG. 4.

Computing system 310 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 310 for storage in memory via a network such as the Internet or upon a carrier medium.

The computer-readable medium containing the computer program may be loaded into computing system 310. All or a portion of the computer program stored on the computer-readable medium may then be stored in system memory 316 and/or various portions of storage devices 332 and 333. When executed by processor 314, a computer program loaded into computing system 310 may cause processor 314 to perform and/or be a means for performing the functions of one or more of the embodiments described and/or illustrated herein. Additionally or alternatively, one or more of the embodiments described and/or illustrated herein may be implemented in firmware and/or hardware. For example, computing system 310 may be configured as an application specific integrated circuit (ASIC) adapted to implement one or more of the embodiments disclosed herein.

Figure 5:
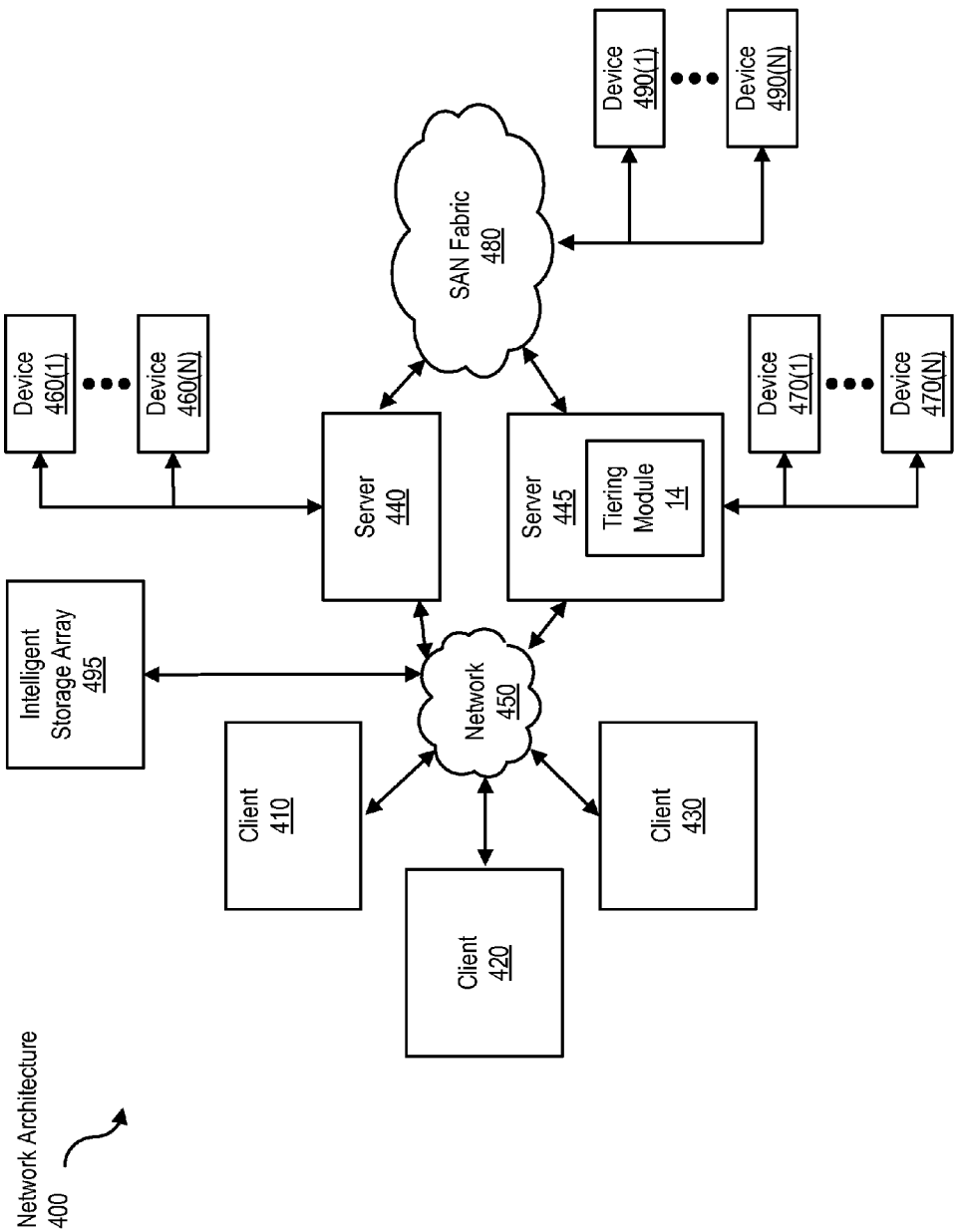
FIG. 5 is a block diagram of a networked system, illustrating how various computing devices can communicate via a network, according to one embodiment of the present invention.

FIG. 5 is a block diagram of a network architecture 400 in which client systems 410, 420, and 430 and servers 440 and 445 may be coupled to a network 450. Client systems 410, 420, and 430 generally represent any type or form of computing device or system, such as computing system 310 in FIG. 4.

Similarly, servers 440 and 445 generally represent computing devices or systems, such as application servers or database servers, configured to provide various database services and/or run certain software applications. Network 450 generally represents any telecommunication or computer network including, for example, an intranet, a wide area network (WAN), a local area network (LAN), a personal area network (PAN), or the Internet. In one example, one or more of client systems 410, 420, and/or 430 may include a tiering module 14 as shown in FIG. 1.

As illustrated in FIG. 5, one or more storage devices 460(1)-(N) may be directly attached to server 440. Similarly, one or more storage devices 470(1)-(N) may be directly attached to server 445. Storage devices 440(1)-(N) and storage devices 470(1)-(N) generally represent any type or form of storage device or medium capable of storing data and/or other computer-readable instructions. In certain embodiments, storage devices 460(1)-(N) and storage devices 470(1)-(N) may represent network-attached storage (NAS) devices configured to communicate with servers 440 and 445 using various protocols, such as Network File System (NFS), Server Message Block (SMB), or Common Internet File System (CIFS).

Servers 440 and 445 may also be connected to a storage area network (SAN) fabric 480. SAN fabric 480 generally represents any type or form of computer network or architecture capable of facilitating communication between multiple storage devices. SAN fabric 480 may facilitate communication between servers 440 and 445 and a plurality of storage devices 490(1)-(N) and/or an intelligent storage array 495. It is noted that intelligent storage array 495 can be connected to servers 440 and 445 by some other medium, such as via network 450. SAN fabric 480 may also facilitate, via network 450 and servers 440 and 445, communication between client systems 410, 420, and 430 and storage devices 490(1)-(N) and/or intelligent storage array 495 in such a manner that devices 490(1)-(N) and array 495 appear as locally attached devices to client systems 410, 420, and 430. As with storage devices 440(1)-(N) and storage devices 470(1)-(N), storage devices 490(1)-(N) and intelligent storage array 495 generally represent any type or form of storage device or medium capable of storing data and/or other computer-readable instructions.

In certain embodiments, and with reference to computing system 310 of FIG. 4, a communication interface, such as communication interface 322 in FIG. 4, may be used to provide connectivity between each client system 410, 420, and 430 and network 450. Client systems 410, 420, and 430 may be able to access information on server 440 or 445 using, for example, a web browser or other client software. Such software may allow client systems 410, 420, and 430 to access data hosted by server 440, server 445, storage devices 440(1)-(N), storage devices 470(1)-(N), storage devices 490(1)-(N), or intelligent storage array 495. Although FIG. 5 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 440, server 445, storage devices 440(1)-(N), storage devices 470(1)-(N), storage devices 490(1)-(N), intelligent storage array 495, or any combination thereof. All or a portion of one or more of the embodiments disclosed herein may also be encoded as a computer program, stored in server 440, run by server 445, and distributed to client systems 410, 420, and 430 over network 450.

In some examples, all or a portion of one of the systems in FIGS. 1, 4, and 5 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a tiering module may transform the behavior of a file system such that a storage array's performance is less negatively impacted due to tiering operation performed by the storage array.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
 receiving information at a storage device, wherein
  the information is configured to be used in implementing a file-based tiering policy,
  the storage device comprises a plurality of tiers and is configured to implement a physical tiering policy,
  the information is received from an application in response to the application detecting that a storage object is subject to the file-based tiering policy,
  the storage device is configured to override an operation,
  the operation is initiated in accordance with the physical tiering policy,
  overriding the operation is based on the file-based tiering policy, and
  the overriding comprises detecting whether the storage object is located in an identified location that complies with the file-based tiering policy; and
 copying the storage object from a current location to the identified location, wherein
  the current location is specified by the physical tiering policy,
  the copying is performed in response to detecting that the storage object is not stored in the identified location, and
  the copying is performed by the storage device.

2. The method of claim 1, further comprising:
 detecting a move operation, wherein
  the move operation specifies that the storage object be transferred from a first tier to a second tier;
 inhibiting the move operation in response to detecting that the second tier is not allowed by the file-based tiering policy.

3. The method of claim 1, further comprising:
 detecting an attribute value of the storage object;
 adding an identification of the storage object to the information based on the attribute value.

4. The method of claim 3, wherein
 the attribute value indicates a file type of the storage object.

5. The method of claim 3, wherein:
 the attribute value indicates a confidentiality of the storage object.

6. The method of claim 1, wherein
 the information comprises an instruction sent by the application to move the storage object from a first tier to a second tier.

7. The method of claim 1, further comprising:
 detecting that the storage object is stored in a first tier, wherein
  the first tier is not allowed by the file-based tiering policy.

8. The method of claim 1, further comprising:
 performing a scan of a plurality of storage objects, wherein
  the scan detects an attribute value for each storage object of the plurality of storage objects; and
 assigning each storage object to a respective location based upon the attribute value for each storage object.

9. A non-transitory computer readable storage medium storing program instructions executable to:
 receive information from an application, wherein
  the information is configured to be used in implementing a file-based tiering policy,
  the storage device comprises a plurality of tiers and is configured to implement a physical tiering policy,
  the information is received from an application in response to the application detecting that a storage object is subject to the file-based tiering policy,
  the storage device is configured to override an operation,
  the operation is initiated in accordance with the physical tiering policy,
  overriding the operation is based on the file-based tiering policy, and
  the overriding comprises detecting whether the storage object is located in an identified location that complies with the file-based tiering policy, and
 cause the storage device to copy the storage object from a current location specified by the physical tiering policy to the identified location, wherein
  copying the storage object is performed in response to detecting that the storage object is not stored in the identified location.

10. The non-transitory computer readable storage medium of claim 9, wherein the program instructions are further executable to:
 detect a move operation, wherein
  the move operation specifies that the storage object be transferred from a first tier to a second tier;
 inhibit the move operation in response to detecting that the second tier is not allowed by the file-based tiering policy.

11. The non-transitory computer readable storage medium of claim 9, wherein the program instructions are further executable to:
 detect an attribute value of the storage object;
 add an identification of the storage object to the information based on the attribute value.

12. The non-transitory computer readable storage medium of claim 11, wherein
 the attribute value indicates a file type of the storage object.

13. The non-transitory computer readable storage medium of claim 11, wherein:
 the attribute value indicates a confidentiality of the storage object.

14. The non-transitory computer readable storage medium of claim 9, wherein the information comprises an instruction sent by the application to move the storage object from a first tier to a second tier.

15. The non-transitory computer readable storage medium of claim 9, wherein the program instructions are further executable to:
  detect that the storage object is stored in a first tier, wherein the first tier is not allowed by the file-based tiering policy.

16. The non-transitory computer readable storage medium of claim 9, wherein the program instructions are further executable to:
  perform a of scan a plurality of storage objects, wherein the scan detects an attribute value for each storage object of the plurality of storage objects; and
  assign each storage object to a respective location based upon the attribute value for each storage object.

17. A system comprising:
  one or more processors; and
  a memory coupled to the one or more processors, wherein the memory stores program instructions executable by the one or more processors to:
    receive information from an application, wherein
      the information is configured to be used in implementing a file-based tiering policy,
      the storage device comprises a plurality of tiers and is configured to implement a physical tiering policy,
      the information is received from an application in response to the application detecting that a storage object is subject to the file-based tiering policy,
      the storage device is configured to override an operation,
      the operation is initiated in accordance with the physical tiering policy,
      overriding the operation is based on the file-based tiering policy, and
      the overriding comprises detecting whether the storage object is located in an identified location that complies with the file-based tiering policy, and
    cause the storage device to copy the storage object from a current location specified by the physical tiering policy to the identified location, wherein
      copying the storage object is performed in response to detecting that the storage object is not stored in the identified location.

18. The system of claim 17, wherein the program instructions are further executable to:
  detect a move operation, wherein
    the move operation specifies that the storage object be transferred from a first tier to a second tier;
  inhibit the move operation in response to detecting that the second tier is not allowed by the file-based tiering policy.

19. The system of claim 17, wherein the program instructions are further executable to:
  detect an attribute value of the storage object;
  add an identification of the storage object to the information based on the attribute value.

20. The system of claim 19, wherein
  the attribute value indicates at least one of a file type of the storage object or a confidentiality of the storage object.

* * * * *